United States Patent
Ko et al.

(10) Patent No.: US 8,792,373 B2
(45) Date of Patent: Jul. 29, 2014

(54) SCHEDULING METHOD AND APPARATUS FOR CONTROL AVERAGE TRANSMISSION RATE IN MULTIPLE ANTENNA SYSTEM

(75) Inventors: Jae-Yun Ko, Suwon-si (KR); Soon-Young Yoon, Seoul (KR); Cheol Mun, Suwon-si (KR); Hee-Jin Jung, Seoul (KR)

(73) Assignees: Samsung Electronics Co., Ltd., Suwon-si (KR); Chungju National University Industry-Academic Cooperation Foundation, Chungju-si (KR)

( * ) Notice: Subject to any disclaimer, the term of this patent is extended or adjusted under 35 U.S.C. 154(b) by 123 days.

(21) Appl. No.: 13/196,537

(22) Filed: Aug. 2, 2011

(65) Prior Publication Data
US 2012/0026910 A1 Feb. 2, 2012

(30) Foreign Application Priority Data
Aug. 2, 2010 (KR) .................. 10-2010-0074691

(51) Int. Cl.
*H04W 72/12* (2009.01)
(52) U.S. Cl.
USPC ........... 370/252; 370/230; 370/231; 370/232; 370/235; 370/328; 370/329; 370/338
(58) Field of Classification Search
USPC ......... 370/230, 231, 232, 235, 236, 328, 329, 370/338
See application file for complete search history.

(56) References Cited

U.S. PATENT DOCUMENTS

| | | | | |
|---|---|---|---|---|
| 7,653,078 B2 * | 1/2010 | Ishii et al. | | 370/412 |
| 7,751,423 B2 * | 7/2010 | Hottinen et al. | | 370/437 |
| 7,839,821 B2 * | 11/2010 | Ishii et al. | | 370/329 |
| 7,864,877 B2 * | 1/2011 | Hottinen | | 375/267 |
| 7,944,906 B2 * | 5/2011 | Xu et al. | | 370/349 |
| 7,983,623 B2 * | 7/2011 | Balachandran et al. | | 455/69 |
| 8,045,644 B2 * | 10/2011 | Yokoyama | | 375/299 |
| 8,054,837 B2 * | 11/2011 | Zhang et al. | | 370/395.4 |
| 8,077,792 B2 * | 12/2011 | Lee et al. | | 375/267 |
| 8,145,248 B2 * | 3/2012 | Han et al. | | 455/512 |
| 8,180,003 B2 * | 5/2012 | Kou et al. | | 375/346 |
| 8,238,836 B2 * | 8/2012 | Li et al. | | 455/67.13 |
| 8,289,875 B2 * | 10/2012 | Wang et al. | | 370/252 |
| 8,331,481 B2 * | 12/2012 | Lee et al. | | 375/295 |
| 8,335,193 B2 * | 12/2012 | Shukla et al. | | 370/331 |
| 8,347,152 B2 * | 1/2013 | Zheng et al. | | 714/704 |
| 8,369,239 B2 * | 2/2013 | Ishii et al. | | 370/252 |
| 2008/0310523 A1 * | 12/2008 | Hui et al. | | 375/260 |
| 2009/0247180 A1 * | 10/2009 | Higuchi et al. | | 455/452.2 |
| 2010/0054113 A1 * | 3/2010 | Haardt et al. | | 370/203 |
| 2010/0103867 A1 * | 4/2010 | Kishiyama et al. | | 370/320 |
| 2010/0157829 A1 * | 6/2010 | Jonsson et al. | | 370/252 |
| 2010/0255790 A1 * | 10/2010 | Farajidana et al. | | 455/69 |

(Continued)

*Primary Examiner* — Ian N Moore
*Assistant Examiner* — Lakeram Jangbahadur

(57) ABSTRACT

A scheduling method in a wireless communication includes receiving a Channel Quality Indicator (CQI) from a plurality of terminals. The method also includes determining an average transmission rate of each terminal based on the CQI by approximating an instantaneous transmission rate distribution to a Gaussian distribution. The method further includes determining a weight of each terminal such that the average transmission rate of each terminal satisfies a target transmission rate. The method also includes selecting a terminal set by applying the determined weight. Thus, it is possible to control the fairness between the terminals and to efficiently control the transmission rate of the terminals according to the required transmission rate and the channel environment of the terminals.

22 Claims, 5 Drawing Sheets

(56) References Cited

U.S. PATENT DOCUMENTS

2010/0290553 A1* 11/2010 Li et al. .................. 375/267
2011/0116464 A1* 5/2011 Ishii et al. ................ 370/329
2011/0122782 A1* 5/2011 Choi et al. ............... 370/252
2011/0268067 A1* 11/2011 Seo et al. ................ 370/329

* cited by examiner

| K | ε(K) | K | ε(K) |
|---|---|---|---|
| 1 | 0.00000 | 11 | 1.58642 |
| 2 | 0.56419 | 12 | 1.62921 |
| 3 | 0.84628 | 13 | 1.66797 |
| 4 | 1.02937 | 14 | 1.70336 |
| 5 | 1.16296 | 15 | 1.73589 |
| 6 | 1.26720 | 16 | 1.76597 |
| 7 | 1.35217 | 17 | 1.79392 |
| 8 | 1.42359 | 18 | 1.82001 |
| 9 | 1.48500 | 19 | 1.84445 |
| 10 | 1.53874 | 20 | 1.86745 |

FIG.2

SCHEDULING METHOD AND APPARATUS FOR CONTROL AVERAGE TRANSMISSION RATE IN MULTIPLE ANTENNA SYSTEM

CROSS-REFERENCE TO RELATED APPLICATION(S) AND CLAIM OF PRIORITY

The present application is related to and claims priority under 35 U.S.C. §119 to a Korean patent application filed in the Korean Intellectual Property Office on Aug. 2, 2010, and assigned Serial No. 10-2010-0074691, the contents of which is herein incorporated by reference.

TECHNICAL FIELD OF THE INVENTION

The present invention relates generally to a scheduling apparatus and method for controlling fairness between terminals and an average transmission rate of each terminal in a downlink wireless communication system including multiple-input multiple-output antennas.

BACKGROUND OF THE INVENTION

Recently, demand for wireless communication service is increasing, which leads to a request to increase wireless communication system capacity. To increase the wireless communication system capacity, Multiple-Input Multiple-Output (MIMO) technology and scheduling technology for managing radio resources are suggested and developed.

Spatial Multiplexing (SM) and Space Division Multiple Access (SDMA) techniques are suggested as the representative of the MIMO technology, and standardized by $3^{rd}$ Generation Partnership Project (3GPP) Long Term Evolution (LTE) and Mobile WiMAX. The SDMA technique increases the system capacity by concurrently sending a data stream to plurality of terminals per cell. Accordingly, how a base station effectively selects terminals to send the data at the same time from all of terminals requesting to send the data (that is, a scheduling method) greatly affects a system capacity gain according to the SDMA technique. Thus, the MIMO technology, particularly, the SDMA technique should be jointly optimized with the scheduling technique.

The scheduling technique in the wireless communication system enables the base station to select a terminal to send the data among the terminals requesting the data transmission. The scheduling should be designed to maintain fairness between the terminals in terms of the data transmission rate and to increase the system capacity.

A representative scheduling algorithm adopted in the wireless communication system is a Proportional Fair (PF) scheduling algorithm. The PF scheduling algorithm allows the terminal having the greatest ratio of an instantaneous transmission rate to an average transmission rate to send data using an instantaneous transmission rate information of each terminal fed back to the base station. Hence, since the data is transmitted to the terminal with the best instantaneous channel state compared to the average channel state, the system transmission capacity is raised and all of the terminals are given the transmission opportunity in the same number of times. As all of the terminals are given the transmission opportunity in the same number of times, the average transmission rate of each terminal is proportional to the average channel state of the corresponding terminal, which is referred to as proportional fairness between the terminals.

However, a PF scheduler, which ensures merely the proportional fairness between the terminals, cannot ensure a minimum required transmission rate for the service with respect to the terminals having low average received Signal to Interference and Noise Ratio (SINR). Further, the PF scheduler can offer the transmission opportunity over a maximum required transmission rate for the service to the terminals having a very good channel state.

In conclusion, in the downlink wireless communication system including MIMO antennas, a scheduling method and a scheduling apparatus are needed to control the fairness between the terminals and to control the transmission rate of the terminals according to the required transmission rate and the channel condition of the terminals.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a scheduling method and a scheduling apparatus for controlling an average transmission rate of a terminal in a multiple antenna system.

Another aspect of the present invention is to provide a scheduling method and a scheduling apparatus for controlling fairness between terminals and controlling a transmission rate of the terminals according to a required transmission rate and channel environment of the terminals in a downlink wireless communication system including MIMO antennas.

According to one aspect of the present invention, a scheduling method in a wireless communication includes receiving a Channel Quality Indicator (CQI) from a plurality of terminals. The method also includes determining an average transmission rate of each terminal based on the CQI by approximating an instantaneous transmission rate distribution to a Gaussian distribution. The method further includes determining a weight of each terminal such that the average transmission rate of each terminal satisfies a target transmission rate. The method also includes selecting a terminal set by applying the determined weight.

According to another aspect of the present invention, a scheduling apparatus in a wireless communication includes a receiver configured to receive a CQI from a plurality of terminals. The scheduling apparatus also includes an average transmission rate determiner configured to determine an average transmission rate of each terminal based on the CQI by approximating an instantaneous transmission rate distribution to a Gaussian distribution. The scheduling apparatus also includes an average transmission rate controller configured to determine a weight of each terminal such that the average transmission rate of each terminal satisfies a target transmission rate. The scheduling apparatus also includes a terminal selector configured to select a terminal set by applying the determined weight.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a table of a value $\epsilon(K)$ based on a value K according to an embodiment of the present invention;

DETAILED DESCRIPTION OF THE INVENTION

Figure 1:
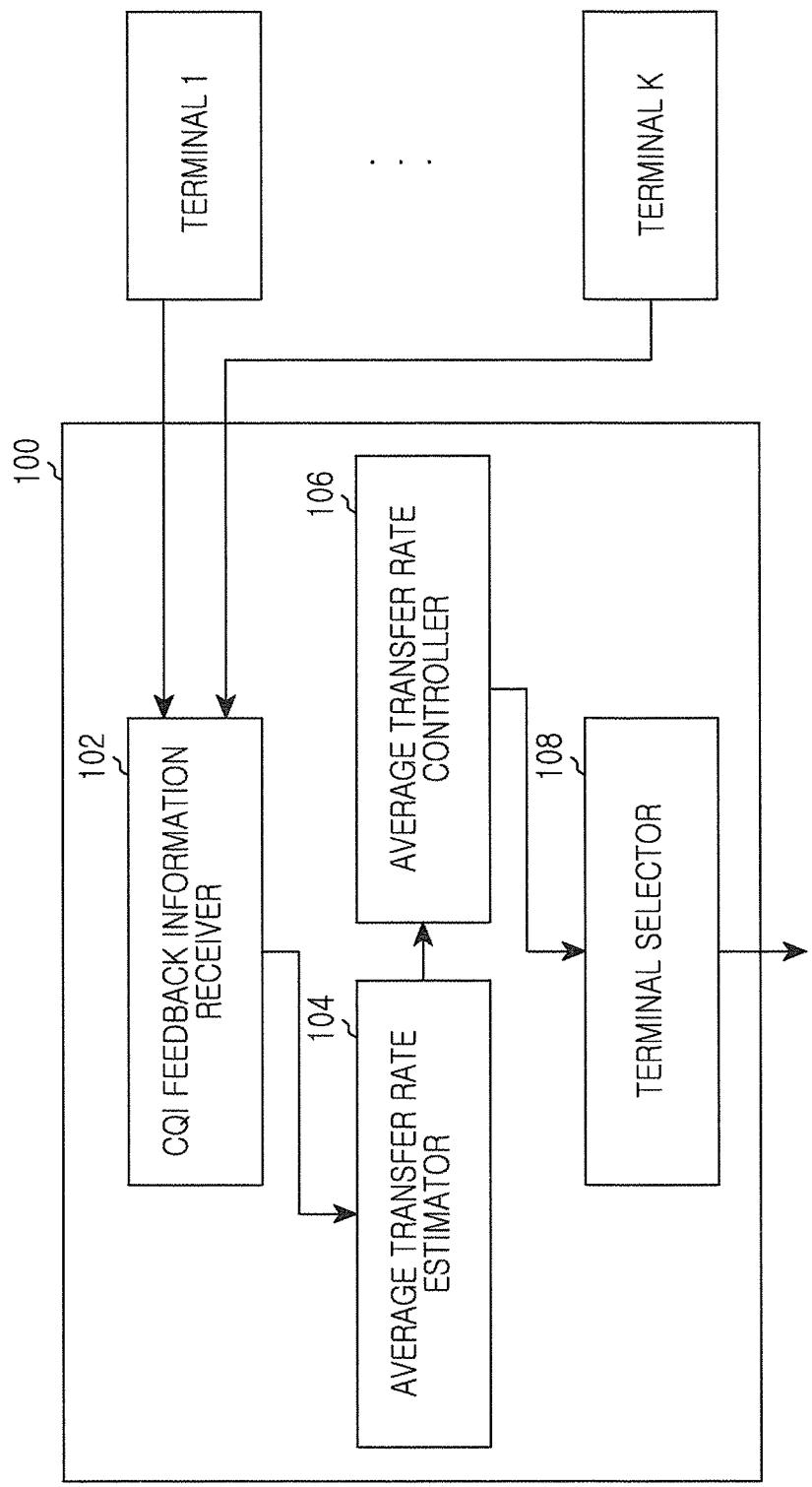
FIG. 1 illustrates a generalized PF scheduler according to an embodiment of the present invention.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, may be different depending on user and operator's intention or practice. Therefore, the terms should be defined on the basis of the disclosure throughout this specification.

Exemplary embodiments of the present invention provide a scheduling apparatus and a scheduling method for controlling fairness between users and an average transmission rate of each user in a downlink wireless communication system including Multiple-Input Multiple-Output (MIMO) antennas.

Generalized Proportional Fair (PF) Scheduling Algorithm

In a downlink cellular network, K-ary terminals wanting to receive downlink data estimate their downlink channel and calculate a maximum transmission rate for sending data over the corresponding link. Each terminal feeds the calculated maximum transmission rate information back to a base station over a reverse link channel. Using the maximum transmission rate information fed back from each terminal, a base station scheduler determines a terminal to service in a next downlink time slot according to a given scheduling algorithm.

A PF scheduling algorithm, which is a representative scheduling algorithm, selects a terminal set $O_S[n]$ to optimize a utility function $f_i(R_i[n])=\log(R_i[n])$ given by Equation 1.

$$O_S[n] = \operatorname*{argmax}_O \left( \sum_{i \in O} f_i(R_i[n]) \right) \quad \text{[Eqn. 1]}$$
$$= \operatorname*{argmax}_O \left( \sum_{i \in O} \log(R_i[n]) \right)$$

In Equation 1, O denotes all feasible subsets for the K-ary terminals wanting the data transmission, and $O_S[n]$ denotes a terminal set selected by a scheduler S to service in the n-th time slot. $R_i[n]$ denotes an average transmission rate of the i-th terminal and is given by Equation 2.

$$R_i[n] = \begin{cases} \frac{T-1}{T} R_i[n-1] + \frac{1}{T} r_i[n], & \text{if } i \in O_S[n] \\ \frac{T-1}{T} R_i[n-1], & \text{otherwise} \end{cases} \quad \text{[Eqn. 2]}$$

In Equation 2, $r_i[n]$ denotes an instantaneous transmission rate of the i-th terminal transmittable in the n-th time slot, and T denotes a time constant for calculating an exponential moving average. Based on Equation 1, the PF scheduling algorithm selects the terminal subset which maximizes the sum of the log value of the average transmission rate of the terminal. That is, the PF scheduling algorithm calculates the log sum of the average transmission rate of the terminals belonging to the subsets O of every possible terminal, selects one subset of the maximum log sum, and transmits data to the terminals belonging to the selected subset.

However, rather than applying the utility function optimization algorithm of Equation 1 to the actual system, the PF scheduling algorithm converts to and implements an optimization algorithm for selecting the terminal set which maximizes the sum of the ratio of the instantaneous transmission rate to the average transmission rate as expressed in Equation 3.

$$O_S[n] = \operatorname*{argmax}_O \sum_{i \in O} \frac{r_i[n]}{R_i[n-1]} \quad \text{[Eqn. 3]}$$

The calculation of Equation 3 is simpler than the calculation of Equation 1, and Equation 3 provides a physical understanding about the scheduling algorithm operation which schedules the terminals having a greater instantaneous transmission rate than the average transmission rate and allows the theoretical capacity analysis. Hence, to apply to the actual system, it is necessary to convert the optimization algorithm for the utility function of Equation 1 to the optimization algorithm of Equation 3 which is equivalent to but much simpler than Equation 1.

A conventional PF scheduling algorithm cannot regulate the fairness degree of the terminals, that is, the difference between the terminal average transmission rates. Also, the conventional PF scheduling algorithm cannot individually regulate the average transmission rate of the terminal. To address those shortcomings, a generalized PF scheduling algorithm is suggested. The generalized PF scheduling algorithm can regulate the fairness between the terminals using a parameter $\alpha$, and individually regulate the average transmission rate of the terminals using a priority parameter $p_i$. The utility function of the generalized PF scheduler is given by Equation 4.

$$f_i(R_i[n]) = \begin{cases} p_i \log(R_i[n]), & \alpha = 1 \\ p_i \dfrac{(R_i[n])^{1-\alpha}}{1-\alpha}, & \text{otherwise} \end{cases} \quad [\text{Eqn. 4}]$$

In Equation 4, when $\alpha=1$ and $p_i=1$ for every $p_i$, the generalized PF scheduling algorithm is the same as the PF scheduling algorithm. As the value $\alpha$ increases, the difference between the average transmission rates of the terminal reduces. The terminal having a greater $p_i$ has more transmission opportunity than a terminal having a smaller value. Hence, the average transmission rate of the terminal can be controlled individually.

The present invention provides the generalized PF scheduling algorithm to apply to the actual system. While the suggested generalized PF scheduling algorithm is theoretically derived from the optimization algorithm for the utility function of Equation 4, its derivation is omitted. While the suggested generalized PF scheduling algorithm is equivalent to the optimization algorithm for the utility function of Equation 4, its calculation is much simpler and allows the theoretical capacity analysis. Thus, the generalized PF scheduling of the present invention allows an average transmission rate prediction method and an average transmission rate control method of the terminal. The suggested generalized PF scheduling of the present invention is given by Equation 5.

$$O_S[n] = \underset{O}{\operatorname{argmax}} \sum_{i \in O} \left\{ p_i \dfrac{r_i[n]}{(R_i[n-1])^{\alpha}} \right\} \quad [\text{Eqn. 5}]$$

FIG. 1 illustrates a generalized PF scheduler according to an embodiment of the present invention.

Referring to FIG. 1, the scheduler 100 includes a Channel Quality Indicator (CQI) feedback information receiver 102, an average transmission rate estimator 104, an average transmission rate controller 106, and a terminal selector 108. The scheduler 100 is included to the base station and used to schedule downlink data.

The CQI feedback information receiver 102 receives CQI information from each terminal over an uplink feedback channel. The CQI information represents one or more signal to noise ratios (e.g., Signal-to-Noise Ratio (SNR), Signal-to-Interference-plus-Noise-Ratio (SINR), Carrier-to-Noise-Ratio (CNR), or Carrier-to-Interference-plus-Noise-Ratio (CINR)) measured by the terminal, with a predetermined number of bits (e.g., five bits or four bits).

The average transmission rate estimator 104 estimates the average transmission rate over a corresponding radio link based on the CQI information fed back from the terminals. The average transmission rate is estimated using an average transmission rate prediction method of the terminal which approximates and estimates the instantaneous transmission rate distribution to Gaussian distribution.

The average transmission rate controller 106 determines the value $\alpha$ and the value $\{p_i\}_{i=1,\ldots,K}$ of the generalized PF scheduler by comparing the estimated average transmission rate of the terminal with a target transmission rate of the terminal so that the average transmission rate of the terminal reaches the target transmission rate. This average transmission rate control is fulfilled by an average transmission rate control method of the terminal of the present invention, which is explained by referring to FIG. 4.

The terminal selector 108 calculates a solution of the optimization algorithm of Equation 5 to select the terminal set $O_S[n]$ to service in each time slot. That is, the terminal selector 108 calculates the sum of the log value of the average transmission rate of the terminal (Equation 5) for every feasible subset $O$ of the terminal and selects one subset having the maximum value as the solution. In so doing, the terminal selector 108 uses the value $\alpha$ and the value $\{p_i\}_{i=1,\ldots,K}$ of the generalized PF scheduler determined by the average transmission rate controller 106.

Lastly, the base station transmits data to the terminals belonging to the subset selected by the terminal selector 108.

Average Transmission Rate Prediction Method of the Terminal According to the Generalized PF Scheduling The generalized PF scheduler regulates the value $\alpha$ for controlling the fairness between the terminals and the value $\{p_i\}_{i=1,\ldots,K}$ for individually controlling the average transmission rate of each terminal. For doing so, the generalized PF scheduler is able to predict the average transmission rate receivable by the terminal according to the given value $\alpha$ and value $\{p_i\}_{i=1,\ldots,K}$. The present invention provides a method for predicting the average transmission rate receivable by each terminal according to the given value $\alpha$ and value $\{p_i\}_{i=1,\ldots,K}$, which is conducted by the average transmission rate estimator 104 of FIG. 1. This method minimizes necessary computation to apply to the actual system through real-time operation.

In the system using the generalized PF scheduling algorithm, when the value $\alpha$ and the value $\{p_i\}_{i=1,\ldots,K}$ are given, the average transmission rate $R_i$ receivable by the i-th terminal is calculated using Equation 6. While Equation 6 is theoretically derived, the derivation is omitted.

$$R_i = \dfrac{\left(p_i x_i^{\mathit{eff}}\right)^{1/\alpha}}{\sum_{k=1}^{K} \dfrac{\left(p_k x_k^{\mathit{eff}}\right)^{1/\alpha}}{x_k^{\mathit{eff}}}} \quad [\text{Eqn. 6}]$$

In Equation 6, $x_i^{\mathit{eff}}$ is calculated based on Equation 7.

$$x_i^{\mathit{eff}} = m_i + \epsilon_i \sigma_i \quad [\text{Eqn. 7}]$$

In Equation 7, an average and a standard deviation when the instantaneous transmission rate distribution receivable by the i-th terminal is approximated to the Gaussian distribution are defined as $m_i$ and $\sigma_i$ respectively. $\epsilon_i$ is a real value determined according to the number of users.

That is, $m_i$, $\sigma_i$ and $\epsilon_i$ can be obtained by approximating the instantaneous transmission rate fed back from each terminal to the Gaussian distribution at the base station scheduler. $\epsilon_i$ of Equation 7 can be calculated based on Equation 8.

$$\epsilon_i \approx \epsilon(K) = K \int_{x=0}^{\infty} x f_{(0,1)}(x)(F_{(0,1)}(x))^{K-1} dx \quad [\text{Eqn. 8}]$$

In Equation 8, $f_{(0,1)}$ and $F_{(0,1)}$ denote a Probability Distribution Function (PDF) and a Cumulative Distribution Function (CDF) of the standard normal distribution. $\epsilon_i$ is approximated to $\epsilon(K)$ determined by the number K of the terminals requesting to receive downlink data, and determined according to the value K as shown in FIG. 2. Hence, the base station scheduler calculates and stores the value $\epsilon(K)$ in advance according to the value K, refers to and uses the stored values in every average transmission rate prediction of the terminal, and thus reduces the real-time calculation used in the scheduling.

Figure 3:
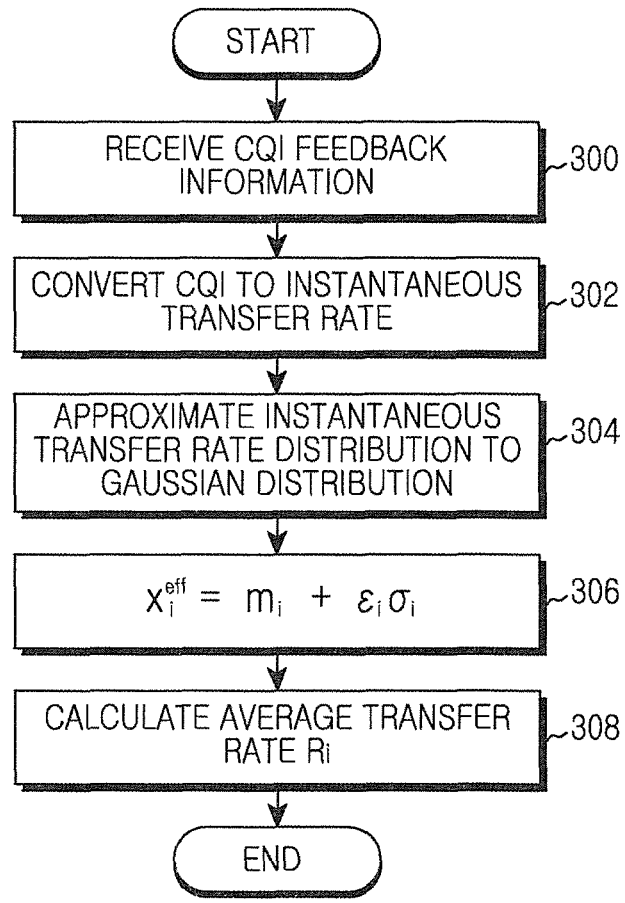
FIG. 3 illustrates a terminal average transmission rate estimation algorithm according to an embodiment of the present invention.

FIG. 3 is a flowchart of a terminal average transmission rate estimation algorithm according to an embodiment of the present invention.

Referring to FIG. 3, the scheduler receives the CQI information of each terminal over the uplink feedback channel in block 300.

In block 302, the scheduler converts the received CQI information of the terminal to the instantaneous transmission rate transmittable over the corresponding radio link. Herein, the scheduler converts the CQI to the instantaneous transmission rate by applying backoff to the CQI fed back from each terminal in every hour, and schedules by considering frame error occurring in the transmission. The instantaneous transmission rate information converted in every time slot is stored for the Gaussian distribution approximation.

In block 304, the scheduler approximates the distribution of instantaneous transmission rate samples stored for each terminal to the Gaussian distribution, and determines the average and the standard deviation as $m_i$ and $\sigma_i$ of Equation 7.

In block 306, the scheduler determines the value $\epsilon(K)$ according to the value K to $\epsilon_i$ of Equation 7 by referring to the table of FIG. 2, and calculates $x_i^{eff} = m_i + \epsilon_i \sigma_i$ of Equation 7 using the determined values $m_i$ and $\sigma_i$.

In block 308, the scheduler calculates the average transmission rate $R_i$ of each terminal by applying the given values $\alpha$ and $\{p\}_{i=1,\ldots,K}$, and the calculated value $x_i^{eff}$ of each terminal to Equation 6.

Average Transmission Rate Control Method of the Terminal in the Generalized PF Scheduling The present invention provides a method for determining the value $\alpha$ and the value $\{p_i\}_{i=1,\ldots,K}$ of the generalized PF scheduler by comparing the estimated average transmission rate of each terminal with the target transmission rate of each terminal, which is to be fulfilled by the average transmission rate controller 106 of FIG. 1, so that the average transmission rate of each terminal reaches the target transmission rate.

The value $\alpha$ in the generalized PF scheduler is used to control the fairness between the terminals. A maximum throughput scheduling is implemented when $\alpha=0$, a proportional fair scheduling is implemented when $\alpha=1$, and a maximin scheduling is implemented when $\alpha=\infty$. Since the value $\alpha$ affects the average transmission rate of the terminal, it cannot be changed to a new value in every scheduling cycle. Thus, the fairness degree used in the wireless network is defined and the value $\alpha$ is specified in accordance with the fairness degree.

To determine the value $\alpha$, for example, when an initial weight value $\{p_i\}_{i=1,\ldots,K}$ for each terminal is given, the value $\alpha$ for satisfying the system transmission rate (the total sum of the terminal average transmission rates $$\sum_{i=1}^{K} R_i$$

with a desired value $R^{sum}$ and satisfying the maximum fairness can be obtained from Equation 9.

$$R^{sum} = \sum_{i=1}^{K} (p_i x_i^{eff})^{1/\alpha} \bigg/ \sum_{k=1}^{K} \frac{(p_k x_k^{eff})^{1/\alpha}}{x_k^{eff}}$$ [Eqn. 9]

When the initial weight value $\{p_i\}_{i=1,\ldots,K}$, the average transmission rate $\{x_i^{eff}\}_{i=1,\ldots,K}$ receivable by each terminal and predicted by the terminal average transmission rate estimation algorithm of FIG. 3, the target system transmission rate $R^{sum}$, the value $\alpha$ satisfying Equation 9 (satisfying the maximum fairness) can be determined. In so doing, the target system transmission rate $R^{sum}$ is lower than $R_{\alpha=0}^{sum}$. Herein, $R_{\alpha=0}^{sum}$ denotes the system transmission rate (i.e., the system transmission rate obtained by the maximum throughput scheduling) achievable when $\alpha=0$. There exists no simple inverse function for determining the value $\alpha$ using $\{p_i\}_{i=1,\ldots,K}$, $\{x_i^{eff}\}_{i=1,\ldots,K}$ and $R^{sum}$ as the input variables in Equation 9. Accordingly, by applying various values (e.g., 0, 0.1, ..., 3.9, 4) to Equation 9, the value $\alpha$ which makes the values of the both sides of Equation 9 most alike (i.e., minimizes the difference of the both side values) is selected.

After the value $\alpha$ is determined, the generalized PF scheduler sets the individual weight value $p_i$ of each terminal. As $p_i$ increases, the corresponding terminal is selected more frequently and the average transmission rate is raised. As $p_i$ decreases, the terminal is selected less frequently and the average transmission rate is lowered. When $p_i$ of one terminal is changed, it affects the average transmission rate of every other terminal. Thus, the present invention provides a method for regulating $p_i$ to increase the transmission rate of the terminal having the very low average transmission rate while not changing the system transmission capacity; that is, the average transmission rate sum of all of the terminals.

The increasing the transmission rate of the terminal having the low average transmission rate while not changing the average transmission rate sum of all of the terminals implies that the average transmission rate of other terminals needs to decrease. Hence, when the average transmission rate of one terminal falls short of the average transmission rate required in the service and concurrently the average transmission rate of one terminal exceeds the required average transmission rate, an algorithm for giving the data transmission opportunity of the terminal of the excess average transmission rate to the terminal of the short average transmission rate is used. The average transmission rate of other terminals may be maintained. The suggested algorithm is now explained.

Assuming that N-ary terminals have the average transmission rate falling short of the average transmission rate required in the service, the concurrent calculation of the solution $p_i$ for increasing the average transmission rate of the N-ary terminals up to the required transmission rate is subject to high computational complexity because it is to calculate an optimal solution in an N-dimensional feasible solution space. Thus, the suggested algorithm selects one of the N-ary terminals having the average transmission rate falling short of the required transmission rate and one of the terminals having the average transmission rate exceeding the required transmission rate, and thus determines the weight value $p_i$ for giving the data transmission opportunity of the terminal of the excess average transmission rate to the terminal of the short average transmission rate. The weight determination for the two selected terminals is performed for N-ary times per step, and thus the weight value $p_i$ for the N-ary terminals to satisfy their target transmission rate can be determined.

When the current average transmission rates of the terminals m and n are $R_m$ and $R_n$ respectively and $\tilde{R}_m$ and $\tilde{R}_n$ are the target average transmission rates, the current weight values $p_m$ and $p_n$ of the terminals m and n are changed to $\tau_m$ and $\tau_n$ based on Equation 10.

$$\tilde{p}_m = \tau_m p_m, \tilde{p}_n = \tau_n p_n$$ [Eqn. 10]

In Equation 10, $\tau_m$ and $\tau_n$ are obtained based on Equation 11.

$$\tau_m = \left(\frac{\tilde{R}_m}{R_m}\right)^\alpha, \tau_n = \left(\frac{\tilde{R}_n}{R_n}\right)^\alpha \qquad [\text{Eqn. 11}]$$

$\tau_m$ and $\tau_n$ satisfy a condition of Equation 12.

$$0 \leq \tau_n \leq \left(1 + \left(\frac{p_m}{p_n}\right)^{1/\alpha}\left(\frac{x_m^{\text{eff}}}{x_n^{\text{eff}}}\right)^{1/\alpha-1}\right)^\alpha, \qquad [\text{Eqn. 12}]$$

$$\tau_m = \left(1 + (1-\tau_n^{1/\alpha})\left(\frac{p_m}{p_n}\right)^{1/\alpha}\left(\frac{x_m^{\text{eff}}}{x_n^{\text{eff}}}\right)^{1/\alpha-1}\right)^\alpha$$

In an embodiment, the PF scheduling with $\alpha=1$ satisfies the simple condition of Equation 13.

$$\tilde{p}_m + \tilde{p}_n = p_m + p_n \qquad [\text{Eqn. 13}]$$

Figure 4:
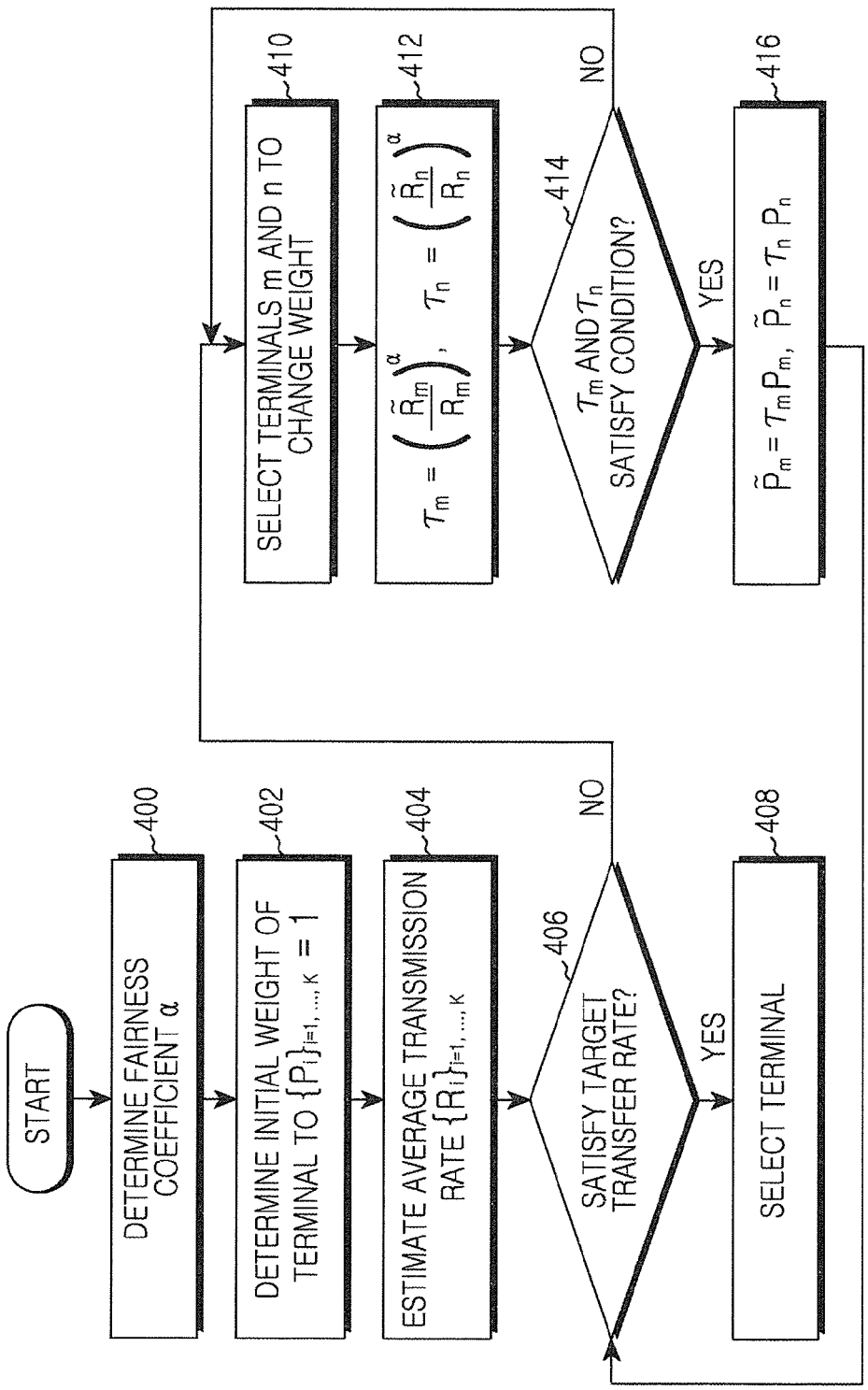
FIG. 4 illustrates a terminal average transmission rate control algorithm according to an embodiment of the present invention.

FIG. 4 is a flowchart of a terminal average transmission rate control algorithm according to an embodiment of the present invention.

Referring to FIG. 4, the scheduler determines the value $\alpha$ to use in block 400. Since the value $\alpha$ affects the whole average transmission rate of the terminal, the fairness degree used in the wireless network is defined and the value $\alpha$ is defined in accordance with the fairness degree. For example, the value $\alpha$ satisfying the system transmission rate with the desired value $R^{sum}$ and satisfying the maximum fairness can be determined based on Equation 9.

In block 402, the scheduler initializes the weight value of each terminal to 1; that is, defines $\{p_i\}_{i=1,\ldots,K}=1$. Next, the weight value of each terminal is continuously updated to satisfy the target transmission rate.

In block 404, the scheduler estimates the average transmission rate of each terminal with the determined value $\alpha$ and the weight value $\{p_i\}_{i=1,\ldots,K}=1$ of each terminal using the terminal average transmission rate estimation algorithm of FIG. 3.

In block 406, the scheduler determines whether the average transmission rate of every terminal meets the target transmission rate by comparing the estimated average transmission rate of each terminal with the target transmission rate. When the average transmission rate of every terminal meets the target transmission rate, the terminal selector of FIG. 1 selects the terminals to send data using the current value $\alpha$ and the terminal weight value $\{p_i\}_{i=1,\ldots,K}$.

By contrast, when the average transmission rate of every terminal does not meet the target transmission rate, the scheduler regulates the terminal weight value $\{p_i\}_{i=1,\ldots,K}$ in blocks 410 through 416.

In block 410, the scheduler selects the terminal m and the terminal n of which the weight value is to change. The scheduler selects the terminal of the average transmission rate falling short of the target transmission rate and the terminal of the average transmission rate exceeding the target transmission rate. This is to give the data transmission opportunity of the terminal of the excess average transmission rate to the terminal of the short average transmission rate.

In block 412, the scheduler calculates $\tau_m$ and $\tau_n$ using the ratio of the target transmission rate and the average transmission rate based on Equation 11.

In block 414, the scheduler checks whether $\tau_m$ and $\tau_n$ calculated in block 412 satisfies the condition of Equation 12.

When the condition is not satisfied, the scheduler repeats the blocks 410 and 412. When the condition is satisfied, the scheduler goes to block 416.

In block 416, the scheduler changes the weight of the terminal m and the terminal n based on Equation 10. Next, the scheduler determines whether every terminal meets the target transmission rate in block 406. The scheduler repeats the blocks 410 and 416 until every terminal satisfies the target transmission rate as much as possible.

In block 408, the scheduler selects the terminal to send data using the value $\alpha$ determined in block 400 and the terminal weight value $\{p_i\}_{i=1,\ldots,K}$ updated in blocks 410 through 416.

Performance Analysis of the Present Technique

The present invention provides the scheduling apparatus and method for controlling the fairness between the users and the average transmission rate of each user in the downlink wireless communication system including the MIMO antennas. To analyze the performance of the suggested techniques, system level simulation is conducted on MIMO mode 2 of Mobile WiMAX. The performance of the average transmission rate estimation and control algorithms of the present generalized PF scheduler is analyzed through the system level simulation results.

Figure 5:
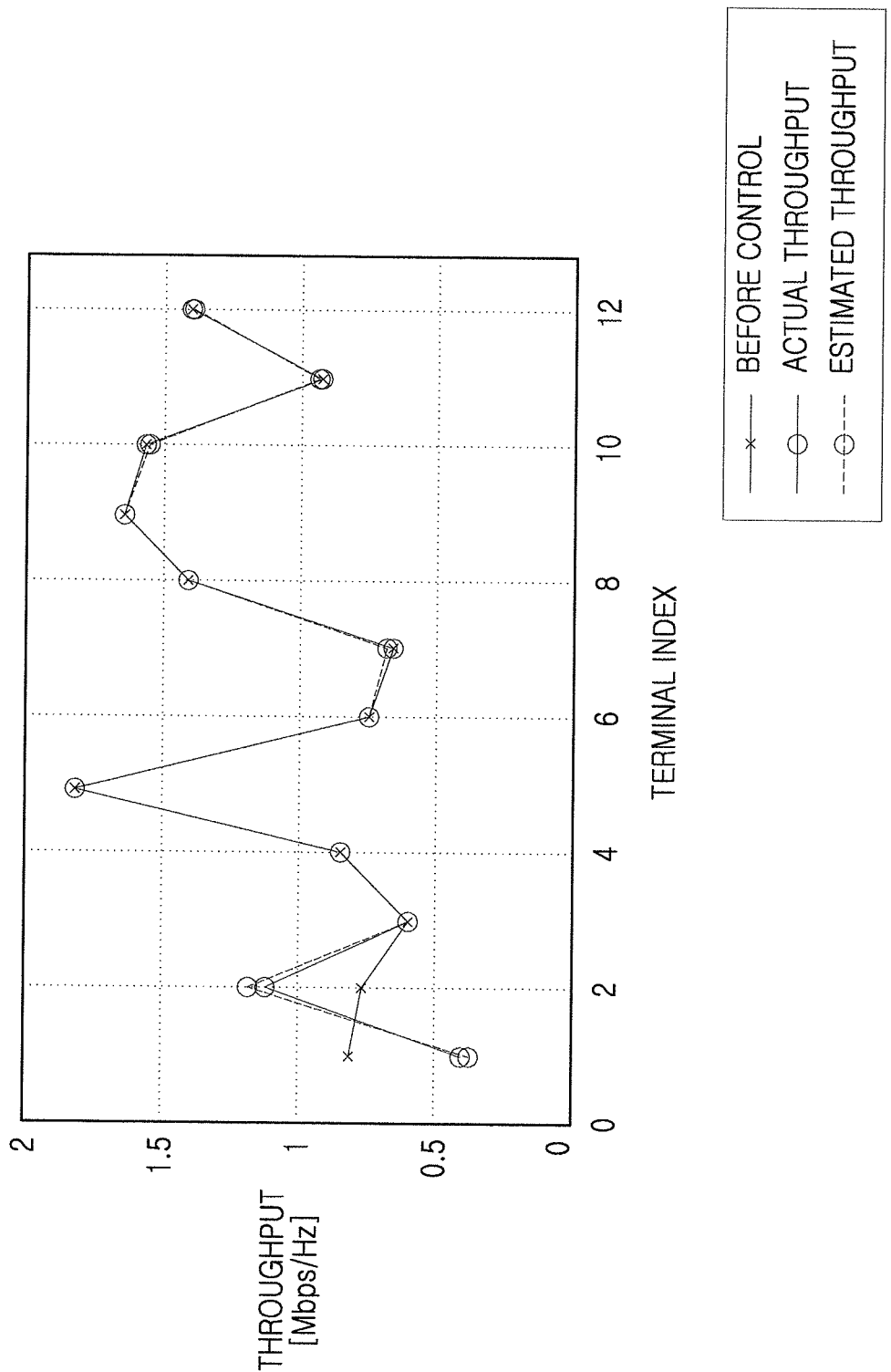
FIG. 5 is a graph of simulation results.

FIG. 5 depicts the average transmission rate of the terminals in the MIMO mode 2 system of WiMAX with 12 users distributed per sector. The value $\alpha$ used in the generalized PF scheduler is assumed to be 1. The result "Before control" indicates the average transmission rate of the terminal when the weight value of every terminal is 1; that is, when $[p_1, p_2, p_3, \ldots, p_{12}]=[1, 1, 1, \ldots, 1]$. "Actual Throughput" indicates the actual average transmission rate of the terminals when the weight value of the terminal is changed to $[\tilde{p}_1, \tilde{p}_2, \tilde{p}_3, \ldots, \tilde{p}_{12}]=[0.5, 1.5, 1, \ldots, 1]$. "Estimated Throughput" indicates the average transmission rate result of the terminal estimated by the present average transmission rate estimation method when the weight value of the terminal is changed to $[\tilde{p}_1, \tilde{p}_2, \tilde{p}_3, \ldots, \tilde{p}_{12}]=[0.5, 1.5, 1, \ldots, 1]$. According to the results of FIG. 5, the estimated average transmission rate of the terminal 1 and the terminal 2 has an error of only about 1.3% and approaches the target transmission rate. The average transmission rate of the terminal 3 through the terminal 12 of the unchanging weight does not change. As such, the average transmission rate prediction and control methods of the present generalized PF scheduler work quite accurately and effectively in the actual system.

As set forth above, by calculating the average transmission rate with the Gaussian distribution and determining the weight and the fairness coefficient to reach the target transmission rate, it is possible to control the fairness between the terminals and to efficiently control the transmission rate of the terminals according to the required transmission rate and the channel environment of the terminals.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A scheduling method in a wireless communication, the method comprising:
   receiving a Channel Quality Indicator (CQI) from a plurality of terminals;
   determining an average transmission rate of each terminal based on the CQI by approximating an instantaneous transmission rate distribution to a Gaussian distribution;

determining a weight of each terminal such that the average transmission rate of each terminal satisfies a target transmission rate; and selecting a terminal set by applying the determined weight, wherein determining the weight of each terminal comprises:

determining whether the average transmission rate of each terminal satisfies the target transmission rate; and determining the weight of each terminal such that a data transmission opportunity of a terminal having the average transmission rate satisfying the target transmission rate is given to another terminal having the average transmission rate not satisfying the target transmission rate.

2. The scheduling method of claim 1, wherein the determining of the average transmission rate of each terminal by approximating the instantaneous transmission rate distribution to the Gaussian distribution comprises:

determining the instantaneous transmission rate distribution by converting the CQI to the instantaneous transmission rate with respect to each terminal;

approximating the instantaneous transmission rate distribution to the Gaussian distribution; and determining the average transmission rate using the instantaneous transmission rate approximated to the Gaussian distribution.

3. The scheduling method of claim 2, wherein the instantaneous transmission rate approximated to the Gaussian distribution is expressed as the following equation:

$$x_i^{eff} = m_i + \epsilon_i \sigma_i$$

where an average and a standard deviation when the instantaneous transmission rate distribution receivable by an i-th terminal is approximated to the Gaussian distribution are defined as $m_i$ and $\sigma_i$ respectively, and $\epsilon_i$ is a real value determined according to the number of users.

4. The scheduling method of claim 3, wherein $\epsilon_i$ is calculated based on the following equation:

$$\epsilon_i \approx \epsilon(K) = K \int_{x=0}^{\infty} x f_{(0,1)}(x) (F_{(0,1)}(x))^{K-1} dx$$

where $f_{(0,1)}$ and $F_{(0,1)}$ denote a Probability Distribution Function (PDF) and a Cumulative Distribution Function (CDF) of a standard normal distribution.

5. The scheduling method of claim 2, wherein the average transmission rate is calculated based on the following equation:

$$R_i = \frac{(p_i x_i^{eff})^{1/\alpha}}{\sum_{k=1}^{K} \frac{(p_k x_k^{eff})^{1/\alpha}}{x_k^{eff}}}$$

where $R_i$ denotes the average transmission rate, $p_i$ denotes the weight of the terminal i, $x_i^{eff}$ denotes the instantaneous transmission rate approximated to the Gaussian distribution for the terminal i, and $\alpha$ denotes a parameter for regulating fairness.

6. The scheduling method of claim 1, wherein the determining of the weight of each terminal such that the average transmission rate of each terminal satisfies the target transmission rate comprises:

determining a fairness coefficient $\alpha$ and initializing the weight of each terminal;

determining whether the average transmission rate of every terminal satisfies the target transmission rate by comparing the determined average transmission rate of each terminal with the target transmission rate;

when the average transmission rate of every terminal does not satisfy the target transmission rate, selecting at least two terminals; and determining the weight to lower the average transmission rate of at least one first terminal of the at least two selected terminals and to raise the average transmission rate of other second terminals.

7. The scheduling method of claim 6, wherein the fairness coefficient $\alpha$ is a value satisfying the target transmission rate $R^{sum}$ and maximum fairness, and is determined based on the following equation:

$$R^{sum} = \sum_{i=1}^{K} (p_i x_i^{eff})^{1/\alpha} / \sum_{k=1}^{K} \frac{(p_k x_k^{eff})^{1/\alpha}}{x_k^{eff}}$$

where $R^{sum}$ denotes the target transmission rate, $p_i$ denotes the weight of the terminal i, $x_i^{eff}$ denotes the instantaneous transmission rate approximated to the Gaussian distribution for the terminal i, and $\alpha$ denotes a parameter for regulating fairness.

8. The scheduling method of claim 6, wherein the selecting of the at least two terminals when the average transmission rate of every terminal does not satisfy the target transmission rate, selects at least one terminal of which the average transmission rate falls short of the target transmission rate and at least one terminal of which the average transmission rate exceeds the target transmission rate.

9. The scheduling method of claim 6, wherein, when two terminals m and n are selected, weights $\tau_m$ and $\tau_n$ are determined based on the following equation:

$$\tau_m = \left(\frac{\tilde{R}_m}{R_m}\right)^{\alpha}, \tau_n = \left(\frac{\tilde{R}_n}{R_n}\right)^{\alpha}$$

where $R_m$ and $R_n$ denote a current average transmission rate of the terminals m and n, $\tilde{R}_m$ and $\tilde{R}_n$ denote target average transmission rates, and $\alpha$ denotes a parameter for regulating fairness.

10. The scheduling method of claim 6, wherein, when two terminals m and n are selected, the determined weight satisfies the following equation:

$$0 \leq \tau_n \leq \left(1 + \left(\frac{p_m}{p_n}\right)^{1/\alpha} \left(\frac{x_m^{eff}}{x_n^{eff}}\right)^{1/\alpha-1}\right)^{\alpha},$$

$$\tau_m = \left(1 + (1 - \tau_n^{1/\alpha})\left(\frac{p_m}{p_n}\right)^{1/\alpha} \left(\frac{x_m^{eff}}{x_n^{eff}}\right)^{1/\alpha-1}\right)^{\alpha}$$

where $p_m$ and $p_n$ denote an initial weight of the terminal m and the terminal n, $x_m^{eff}$ and $x_n^{eff}$ denote the instantaneous transmission rate approximated to the Gaussian distribution for the terminal m and the terminal n, and $\alpha$ denotes a parameter for regulating fairness.

11. The scheduling method of claim 1, wherein the selecting of the terminal set is based on a generalized Proportional Fair (PF) algorithm of the following equation:

$$O_S[n] = \underset{O}{\mathrm{argmax}} \sum_{i \in O} \left\{ p_i \frac{r_i[n]}{(R_i[n-1])^{\alpha}} \right\}$$

where O denotes all feasible subsets for K-ary terminals wanting to send data, $O_S[n]$ denotes a terminal set selected by a scheduler S to service in an n-th time slot, $p_i$ denotes the weight of the terminal i, $\alpha$ denotes a parameter for regulating fairness, $R_i[n]$ denotes the average transmission rate of the i-th terminal, and $r_i[n]$ denotes the instantaneous transmission rate of the i-th terminal transmittable in the n-th time slot.

12. A scheduling apparatus in a wireless communication comprising:
a receiver configured to receive a Channel Quality Indicator (CQI) from a plurality of terminals;
an average transmission rate determiner configured to determine an average transmission rate of each terminal based on the CQI by approximating an instantaneous transmission rate distribution to a Gaussian distribution;
an average transmission rate controller configured to determine a weight of each terminal such that the average transmission rate of each terminal satisfies a target transmission rate; and
a terminal selector configured to select a terminal set by applying the determined weight,
wherein the average transmission rate controller is configured to determine whether the average transmission rate of each terminal satisfies the target transmission rate, and determine the weight of each terminal such that a data transmission opportunity of a terminal having the average transmission rate satisfying the target transmission rate is given to another terminal having the average transmission rate not satisfying the target transmission rate.

13. The scheduling apparatus of claim 12, wherein the average transmission rate determiner determines the instantaneous transmission rate distribution by converting the CQI to the instantaneous transmission rate with respect to each terminal, approximates the instantaneous transmission rate distribution to the Gaussian distribution, and determines the average transmission rate using the instantaneous transmission rate approximated to the Gaussian distribution.

14. The scheduling apparatus of claim 13, wherein the instantaneous transmission rate approximated to the Gaussian distribution is expressed as the following equation:

$$x_i^{eff} = m_i + \epsilon_i \sigma_i$$

where an average and a standard deviation when the instantaneous transmission rate distribution receivable by an i-th terminal is approximated to the Gaussian distribution are defined as $m_i$ and $\sigma_i$ respectively, and $\epsilon_i$ is a real value determined according to the number of users.

15. The scheduling apparatus of claim 14, wherein $\epsilon_i$ is calculated based on the following equation:

$$\epsilon_i \approx \epsilon(K) = K \int_{x=0}^{\infty} x f_{(0,1)}(x) (F_{(0,1)}(x))^{K-1} dx$$

where $f_{(0,1)}$ and $F_{(0,1)}$ denote a Probability Distribution Function (PDF) and a Cumulative Distribution Function (CDF) of a standard normal distribution.

16. The scheduling apparatus of claim 13, wherein the average transmission rate is calculated based on the following equation:

$$R_i = \frac{\left(p_i x_i^{eff}\right)^{1/\alpha}}{\sum_{k=1}^{K} \frac{\left(p_k x_k^{eff}\right)^{1/\alpha}}{x_k^{eff}}}$$

where $R_i$ denotes the average transmission rate, $p_i$ denotes the weight of the terminal i, $x_i^{eff}$ denotes the instantaneous transmission rate approximated to the Gaussian distribution for the terminal i, and $\alpha$ denotes a parameter for regulating fairness.

17. The scheduling apparatus of claim 12, wherein the average transmission rate controller determines a fairness coefficient $\alpha$, initializes the weight of each terminal, determines whether the average transmission rate of every terminal satisfies the target transmission rate by comparing the determined average transmission rate of each terminal with the target transmission rate, selects at least two terminals when the average transmission rate of every terminal does not satisfy the target transmission rate, and determines the weight to lower the average transmission rate of at least one first terminal of the at least two selected terminals and to raise the average transmission rate of other second terminals.

18. The scheduling apparatus of claim 17, wherein the fairness coefficient $\alpha$ is a value satisfying the target transmission rate $R^{sum}$ and maximum fairness, and is determined based on the following equation:

$$R^{sum} = \sum_{i=1}^{K} \left(p_i x_i^{eff}\right)^{1/\alpha} / \sum_{k=1}^{K} \frac{\left(p_k x_k^{eff}\right)^{1/\alpha}}{x_k^{eff}}$$

where $R^{sum}$ denotes the target transmission rate, $p_i$ denotes the weight of the terminal i, $x_i^{eff}$ denotes the instantaneous transmission rate approximated to the Gaussian distribution for the terminal i, and $\alpha$ denotes a parameter for regulating fairness.

19. The scheduling apparatus of claim 17, wherein the average transmission rate controller selects at least one terminal of which the average transmission rate falls short of the target transmission rate and at least one terminal of which the average transmission rate exceeds the target transmission rate.

20. The scheduling apparatus of claim 17, wherein, when two terminals m and n are selected, weights $\tau_m$ and $\tau_n$ are determined based on the following equation:

$$\tau_m = \left(\frac{\tilde{R}_m}{R_m}\right)^\alpha, \tau_n = \left(\frac{\tilde{R}_n}{R_n}\right)^\alpha$$

where $R_m$ and $R_n$ denote a current average transmission rate of the terminals m and n, $\tilde{R}_m$ and $\tilde{R}_n$ denote target average transmission rates, and $\alpha$ denotes a parameter for regulating fairness.

21. The scheduling apparatus of claim 17, wherein, when two terminals m and n are selected, the determined weight satisfies the following equation:

$$0 \le \tau_n \le \left(1 + \left(\frac{p_m}{p_n}\right)^{1/\alpha} \left(\frac{x_m^{eff}}{x_n^{eff}}\right)^{1/\alpha - 1}\right)^\alpha,$$

$$\tau_m = \left(1 + (1 - \tau_n^{1/\alpha})\left(\frac{p_m}{p_n}\right)^{1/\alpha} \left(\frac{x_m^{eff}}{x_n^{eff}}\right)^{1/\alpha - 1}\right)^\alpha$$

where $p_m$ and $p_n$ denote an initial weight of the terminal m and the terminal n $x_m^{eff}$ and $x_n^{eff}$ denote the instantaneous transmission rate approximated to the Gaussian distribution for the terminal m and the terminal n, and $\alpha$ denotes a parameter for regulating fairness.

22. The scheduling apparatus of claim 12, wherein the terminal selector performs a Proportional Fair (PF) schedul ing algorithm based on a generalized PF algorithm of the following equation:

$$O_S[n] = \underset{O}{\operatorname{argmax}} \sum_{i \in O} \left\{ p_i \frac{r_i[n]}{(R_i[n-1])^\alpha} \right\}$$

where O denotes all feasible subsets for K-ary terminals wanting to send data, $O_S[n]$ denotes a terminal set selected by a scheduler S to service in an n-th time slot, $p_i$ denotes the weight of the terminal i, $\alpha$ denotes a parameter for regulating fairness, $R_i[n]$ denotes the average transmission rate of the i-th terminal, and $r_i[n]$ denotes the instantaneous transmission rate of the i-th terminal transmittable in the n-th time slot.

* * * * *